United States Patent [19]
Miyake et al.

[11] Patent Number: 5,343,448
[45] Date of Patent: Aug. 30, 1994

[54] EXTERNAL MAGNETIC FIELD DEVICE FOR A MAGNETOOPTICAL INFORMATION RECORDING AND REPRODUCING APPARATUS

[75] Inventors: Tomoyuki Miyake, Tenri; Hiroyuki Katayama; Junichiro Nakayama, both of Nara; Takahiro Miyake, Tenri; Kenji Ohta; Shozo Kobayashi, both of Nara, all of Japan

[73] Assignee: Sharp Kabushiki Kaiasha, Osaka, Japan

[21] Appl. No.: 949,335

[22] Filed: Sep. 22, 1992

Related U.S. Application Data

[63] Continuation of Ser. No. 734,049, Jul. 22, 1991, abandoned, which is a continuation of Ser. No. 382,861, Jul. 20, 1989, abandoned.

[30] Foreign Application Priority Data

Jul. 20, 1988 [JP] Japan .................. 63-180711

[51] Int. Cl.⁵ .................. G11B 11/00; G11B 11/10
[52] U.S. Cl. .................. 369/13; 360/114
[58] Field of Search .................. 369/13; 360/59, 114; 365/122

[56] References Cited

U.S. PATENT DOCUMENTS

| 4,672,594 | 6/1987 | Kato et al. ................... 360/114 |
| 4,796,241 | 1/1989 | Hayakawa et al. ............. 360/114 X |
| 4,926,403 | 5/1990 | Tsuyuguchi et al. ............ 369/13 |
| 4,937,801 | 6/1990 | Miura et al. .................. 360/114 X |

FOREIGN PATENT DOCUMENTS 0251561 1/1988 European Pat. Off. .

OTHER PUBLICATIONS

Patent Abstracts of Japan, vol. 8, No. 271, (P-320) (Dec. 12, 1984) and corresponding Japanese Patent Publication No. 59-139120.

Primary Examiner—David Mis
Attorney, Agent, or Firm—Morrison & Foerster

[57] ABSTRACT

An external magnetic field device for a magnetooptical information recording and reproducing apparatus in which an external magnetic field to be applied to a magnetooptical information recording medium is modulated by supplying to a magnetic head an alternate current the polarity of which is changed according to information to be recorded. The device comprises an offset circuit for producing an offset in the alternate current. The direction of the offset is selected so as to increase the current level of the polarity by which the initial magnetization of the information recording medium is reversed. The direction of the offset may be selected so as to cancel the leakage magnetic field.

8 Claims, 4 Drawing Sheets

EXTERNAL MAGNETIC FIELD DEVICE FOR A MAGNETOOPTICAL INFORMATION RECORDING AND REPRODUCING APPARATUS

This application is a continuation of application Ser. No. 07/734,049, filed Jul 22, 1991, now abandoned, which in turn is a continuation of application Ser. No. 07/382,861, filed Jul. 20, 1989, now abandoned.

BACKGROUND OF THE INVENTION

1. Field of the invention

The present invention relates to an external magnetic field device for a magnetooptical information recording and reproducing apparatus in which information is recorded by modulating a magnetic field.

2. Description of the prior art

In a rewritable optical information recording system, a magnetooptical information recording apparatus is used to invert the direction of the magnetization of a magnetooptical information recording medium (hereinafter, referred to as merely "a medium") which, in the initial state, has been uniformly magnetized in either direction (the initial state). This magnetooptical information recording apparatus is operated by one of two methods: the optical modulation method; or the magnetic field modulation method.

When the optical modulation method is employed, the magnetization of a medium is inverted only when a laser beam irradiated thereon is enhanced in intensity. When information is rewritten, hence, the optical modulation method requires an erasing operation prior to the writing operation, so that the magnetization of the medium is returned to its initial state, with the result that the access rate is substantially decreased.

As a result, the magnetic field modulation method has begun to attract attention. In the magnetic field modulation method, the polarity of an external magnetic field which is generated by an external magnetic field device and applied to a medium is changed to invert the magnetization of the medium, while the intensity of the laser beam is kept constant. Therefore, the magnetization of the medium always corresponds to the direction of the external magnetic field, enabling a direct overwrite in the rewriting operation (i.e., information can be rewritten without executing the erasing operation).

However, the magnetic field modulation method has the following two drawbacks.

When information is recorded, an alternate current must be continuously supplied to an external magnetic field device, thereby increasing the copper loss and iron loss of the device. This causes the external magnetic field device to generate a large amount of heat which should be dissipated therefrom. Conventionally, the sole measure for solving this problem is to install a cooling fan for cooling the external magnet. The installation of a cooling fan in the device causes other problems in that the production cost of the apparatus is increased, that a noise is generated from the cooling fan, and that a large space for installing the cooling fan is required.

The second problem is that the recording of information requires an external magnetic field of hundreds Oe (about $1 \sim 5 \times 10^4$ A/m). When a magnetic coil is employed in an external magnetic field device, therefore, the number of turns must be great, resulting in a high inductance of the coil. This high inductance of the coil causes the magnetization reversing time to be long, thereby increasing the difficulty in the recording in the order of MHz.

If a medium in which information can be recorded under a weak magnetic field is used, the number of turns of the coil can be reduced so that the use of such a medium may eliminate the above-mentioned problem. In this case, however, it is necessary to consider a leakage magnetic field generated by an actuator for focusing or tracking the laser beam in the apparatus because such a medium is influenced by a weak magnetic field.

SUMMARY OF THE INVENTION

The external magnetic field device for a magnetooptical information recording and reproducing apparatus of this invention, which overcomes the above-discussed and numerous other disadvantages and deficiencies of the prior art, comprises an external magnetic field to be applied to a magnetooptical information recording medium when recording information is modulated by supplying to a magnetic field generating means an alternate current the polarity of which is changed according to information to be recorded, the improvement exists in that said device comprises an offset means for producing an offset in said alternate current, said offset being so directed as to increase the current level of the polarity by which the initial magnetization of said information recording medium is reversed.

In a preferred embodiment, the magnetic field generating means is a magnetic coil of a magnetic head.

In a preferred embodiment, the ratio of the current level having said polarity to the other current level having the polarity opposite to said polarity is 7:3.

The external magnetic field device for a magnetooptical information recording and reproducing apparatus of this invention in which an external magnetic field to be applied to a magnetooptical information recording medium when recording information is modulated by supplying to a magnetic field generating means an alternate current the polarity of which is changed according to information to be recorded, the improvement exists in that said device comprises an offset means for producing an offset in said alternate current, said offset being so directed as to cancel the leakage magnetic field which is caused by another magnetic field generating means in said apparatus and applied to said information recording medium.

In a preferred embodiment, the magnetic field generating means is a magnetic coil of a magnetic head.

In a preferred embodiment, the other magnetic field generating means is an actuator for focusing a laser beam onto said information recording medium.

In a preferred embodiment, the other magnetic field generating means is an actuator for tracking a laser beam on said information recording medium.

Thus, the invention described herein makes possible the objectives of (1) providing an external magnetic field device for a magnetooptical information recording and reproducing apparatus which can be operated by a small amount of a current;

(2) providing an external magnetic field device for a magnetooptical information recording and reproducing apparatus which produces a reduced amount of heat;

(3) providing an external magnetic field device for a magnetooptical information recording and reproducing apparatus which can eliminate the use of a cooling fan;

(4) providing an external magnetic field device for a magnetooptical information recording and reproducing apparatus which can be sufficiently operated under a leakage magnetic field caused by another device;

(5) providing an external magnetic field device for a magnetooptical information recording and reproducing apparatus in which the inductance of a magnetic field generating means can be reduced; and (6) providing an external magnetic field device for a magnetooptical information recording and reproducing apparatus which can be used in the recording operation in the order of MHz.

When information is recorded on a medium, the magnetization of a medium is inverted by a modulation magnetic field the polarity of which is reversed according to the information to be recorded. Because of the presence of a demagnetization field, the strength of the magnetic field required for inverting the magnetization from the initial state is greater than that required for magnetizing the medium toward the initial state. Therefore, the minimum current level for inverting the magnetization from the initial state is greater than that for magnetizing the medium toward the initial state. An alternate current for recording information which is supplied to a coil can be offset so that the current level in the polarity for inverting the magnetization from the initial state is greater than that in the polarity for magnetizing the medium toward the initial state.

The above-mentioned relationship between the minimum current levels in both directions is also applicable to the operation of overwriting a medium. In the case that information is to be recorded in grooves, the magnetization of the medium in grooves is inverted in accordance with the information to be recorded, while the magnetization of the medium in lands surrounding the grooves is maintained in the initial state. When grooves are overwritten (i.e., information recorded in grooves is rewritten), a stray magnetic field caused by the medium in the lands affects the magnetization of the medium so that the minimum current level for the inversion of the magnetization is greater than that for magnetizing the medium toward the initial state.

By contrast, in the case that information is to be recorded in lands, the magnetization of the medium in lands is inverted in accordance with the information to be recorded, while the magnetization of the medium in the grooves surrounded by lands is maintained in the initial state. When lands are overwritten (i.e., information recorded in lands is rewritten), a stray magnetic field caused by the medium in the grooves affects the magnetization of the medium so that the minimum current level for the inversion of the magnetization is greater than that for magnetizing the medium toward the initial state.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
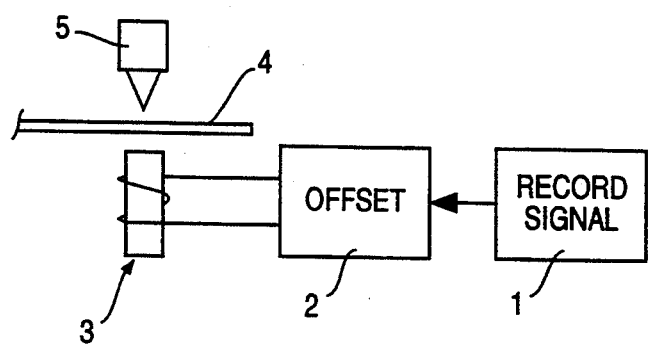
FIG. 1 is a block diagram illustrating an external magnetic field device according to the invention.

FIG. 1 shows an external magnetic field device used in a magnetooptical information recording and reproducing apparatus. The external magnetic field device shown in FIG. 1 comprises a record signal circuit 1, an offset circuit 2, and a magnetic head 3. The output of the record signal circuit 1 is supplied to a coil of the magnetic head 3 via the offset circuit 2. The magnetic head 3 is arranged under a magnetooptical disk 4 in which a magnetooptical information recording medium is uniformly formed. An optical pickup 5 which emits a laser beam to the medium in the access operation is arranged above the disk 4.

The magnetic head 3 has a column-like magnetic core made of MnZn ferrite wound by a coil of a Cu wire (50 $\mu$m in diameter, 50 turns). The material of the magnetic head 3 is not restricted to the above, but can be selected from a wide variation. Alternatively, the core of the magnetic head 3 may be cylindrical or pot-shaped.

The medium of the optical disk 4 is of an amorphous (GdTb)Fe system. The coercive force of the medium can be decreased by increasing the amount of Gd as compared with that of Tb, without changing the Curie temperature of the medium. When $(Gd_{0.68}Tb_{0.32})_{0.3}Fe_{0.7}$ is used as the medium, information can be recorded in the medium under a magnetic field as weak as about 100 Oe ($7.9 \times 10^3$ A/m). In other words, even when the coil of a reduced number of turns (50 turns) is used in the magnetic head 3, the magnetizing reversing time of the medium made of such a material can be reduced. The medium of the disk 4 is previously initialized to be uniformly magnetized in the predetermined direction.

Figure 2A:
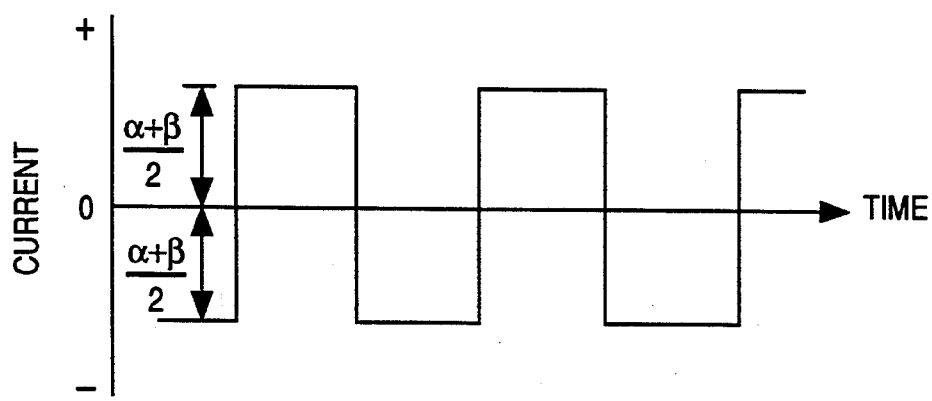
FIG. 2 illustrates the wave forms of the alternate current output from a record signal circuit and the offset alternate current in the device shown in FIG. 1.

The record signal circuit 1 outputs an alternate current for recording information, as shown in FIG. 2(A). The alternate current pulsates so that its polarity inverts in accordance with information to be recorded. The relationship between information to be recorded and the polarity of the alternate current varies depending upon the modulation system employed in the information recording and reproducing apparatus.

Figure 3:
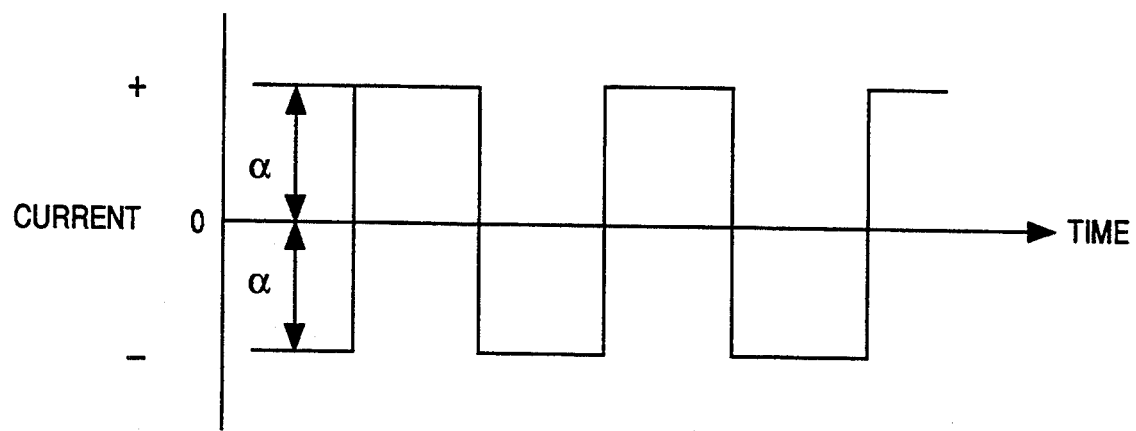
FIG. 3 illustrates the wave form the alternate current output from a record signal circuit in a prior art device.

In a prior art device, the alternate current output from the record signal circuit 1 is directly supplied to the magnetic head 3. If the current of $\lambda$A in the plus direction must be supplied to the magnetic coil 3 to invert the magnetization of the medium of the disk 4 from the initial state, the alternate current in a prior art device must have the amplitude of $\lambda$A in both the plus and minus sides (i.e., the peak-to-peak value of $2\lambda$A), as shown in FIG. 3. Hereinafter, the polarity of the alternate current required for inverting the magnetization of the medium from the initial state is referred to as "the forward polarity", and the polarity of the alternate current required for returning the magnetization to the direction of the initial state (i.e., the polarity opposite to the forward polarity) is referred to as "the backward polarity".

In the device according to the invention shown in FIG. 1, however, the amplitude of the alternate current output from the record signal circuit 1 can be reduced as shown in FIG. 2(A).

Figure 2B:
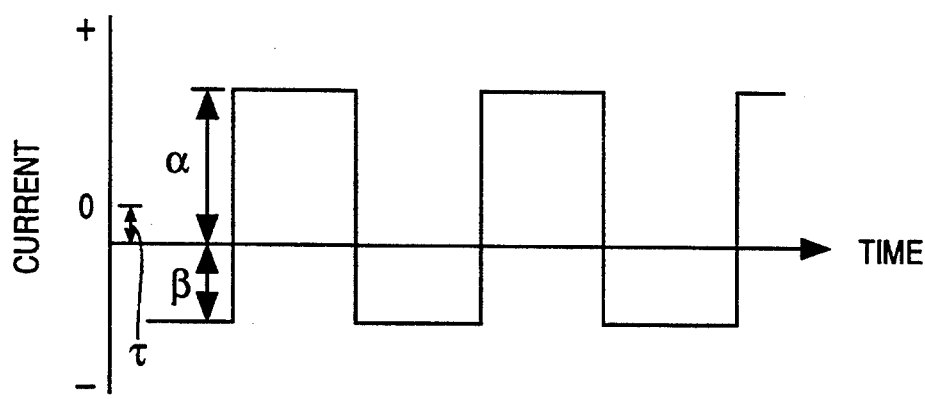

The offset circuit 2 produces an offset $\tau$ in the alternate current supplied from the record signal circuit 1, as shown in FIG. 2(B). The offset value $\tau$ is selected so that the amplitude of the alternate current in the forward polarity (in this case, the plus side) is $\alpha A$, and that the amplitude of the alternate current in the backward polarity (in this case, the minus side) is $\beta A$ which is necessary for returning the magnetization to the direction of the initial state. That is, the offset amount $\tau$ is $(\alpha - \beta)/2A$. As described above, there is the relationship of $\alpha > \beta$, because of the demagnetization field or the stray magnetic field.

Therefore, the alternate current supplied from the record signal circuit 1 has the amplitude of $(\alpha + \beta)/2$ in both the plus and minus sides (i.e., the peak-to-peak value of $(\alpha + \beta)$). The offset alternate current from the offset circuit 2 is supplied to the coil of the magnetic head 3 to conduct the information recording with the magnetic modulation method. Consequently, the amount of the current supplied to the magnetic head 3 is reduced by $(\alpha - 62)$ as compared with that in the prior art device, resulting in that the heat generated in the magnetic head 3 is decreased by the amount corresponding to the reduction of the current.

Figure 4:
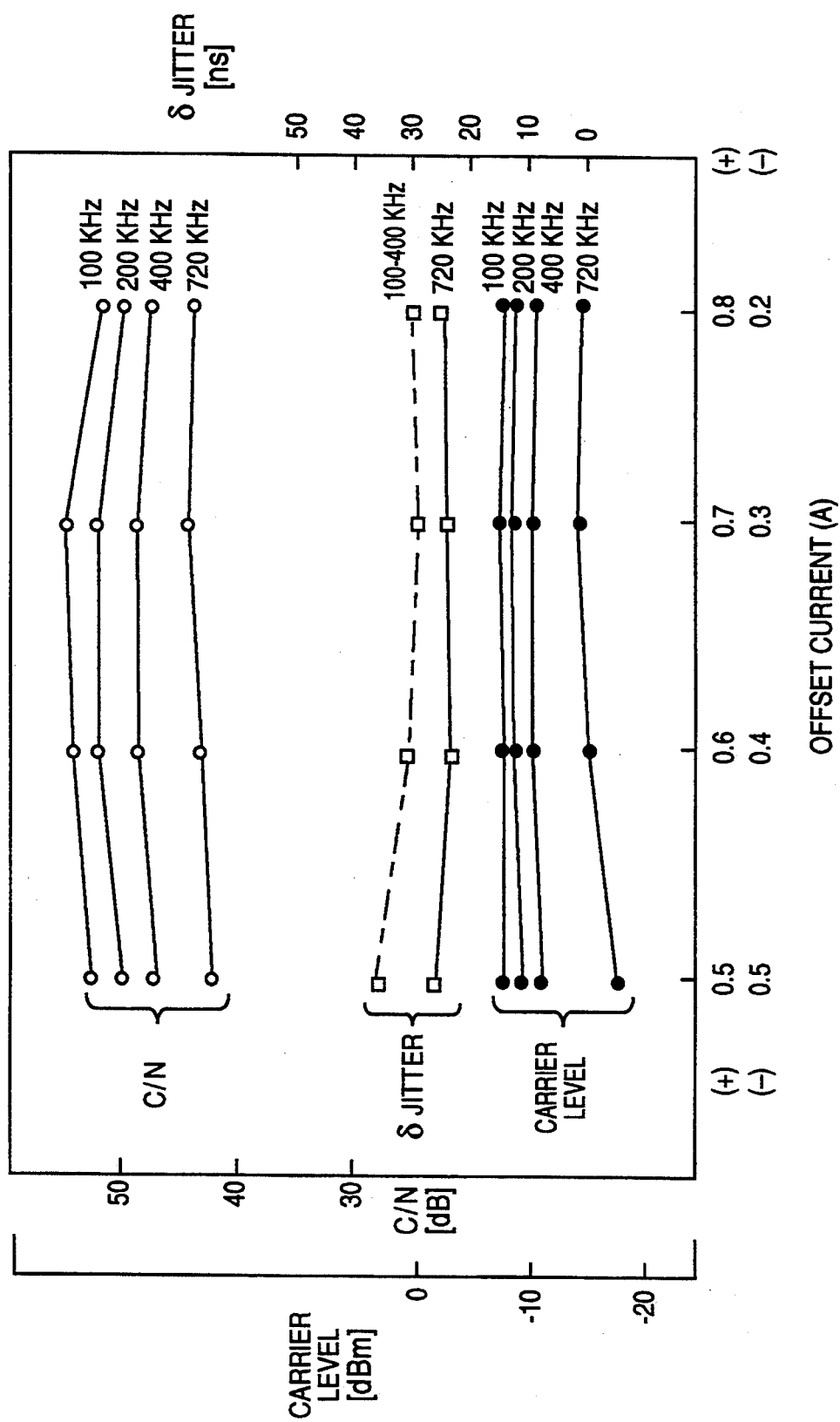
FIG. 4 is a graph showing the variations in characteristics when the degree of the offset is changed.

In order to obtain the optimum value of the offset $\tau$, data having the band width of 10 kHz were recorded with the recording frequency of 100-720 kHz using the apparatus shown in FIG. 1, under the following conditions: the disk revolution speed was 450 rpm, the output of the writing laser beam was 6.0 mW, the output of the reproducing laser beam was 1.0 mW. In this experiment, the variations in the C/N (carrier to noise) ratio, the $\delta$ jitter and the carrier level were measured while variously changing the offset value $\tau$. The amplitude in the plus and minus sides of the alternate current were selected to be 0.5 A and 0.5 A ($\tau = 0$ A), 0.6 A and 0.4 A ($\tau = 0.1$ A), 0.7 A and 0.3 A ($\tau = 0.2$ A), and 0.8 A and 0.2 A ($\tau = 0.3$ A) so that the offset value was changed from 0 A to 0.3 A in steps of 0.1 A. Under these conditions, the magnetic head 3 generates the same heat. FIG. 4 shows the results.

As seen from FIG. 4, the C/N ratio is improved with the increase of the amplitude in the plus side of the alternate current from 0.5 A, and reaches the maximum at the amplitude of 0.7 A in every recording frequencies (i.e., when the ratio of the amplitudes in the plus and minus sides is 7:3). When the the amplitude in the plus side is increased further, the C/N ratio is gradually declined. It seems that this decline of the C/N ratio is caused by the insufficiency of the amplitude in the minus side of the alternate current.

Data were repeatedly recorded in and erased from the medium (that is, the medium was overwritten 10 times) at the amplitude on the plus side of 0.7 A, and the C/N ratio was measured at every writing. The measured values of the C/N ratio were substantially unchanged from the value obtained at the first writing.

In the device shown in FIG. 1, the maximum C/N ratio was obtained when the alternate current having the plus amplitude of 0.7 A and minus amplitude of 0.3 A was supplied to the magnetic head 3. In a prior art device, by contrast, it is necessary for obtaining the same C/N ratio as this value to supply an alternate current having the plus amplitude of 0.7 A and minus amplitude of 0.7 A. Consequently, the heat generated in the magnetic head 3 of the device shown in FIG. 1 is extremely less than that generated in a prior art device.

If magnetic fluxes produced by the actuator in the optical head 5 leak out therefrom to form a leakage magnetic field, such a leakage magnetic field exerts a bad influence upon the information recording on the medium. According to the invention, this influence can be eliminated, as described below with reference to FIG. 5.

Figure 5A:
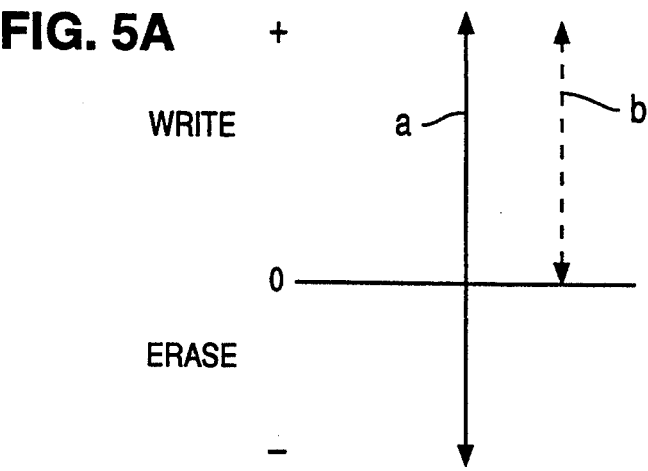
FIG. 5 illustrates diagrammatically the relationship between the alternate current and the leakage magnetic field.
Figure 5B:
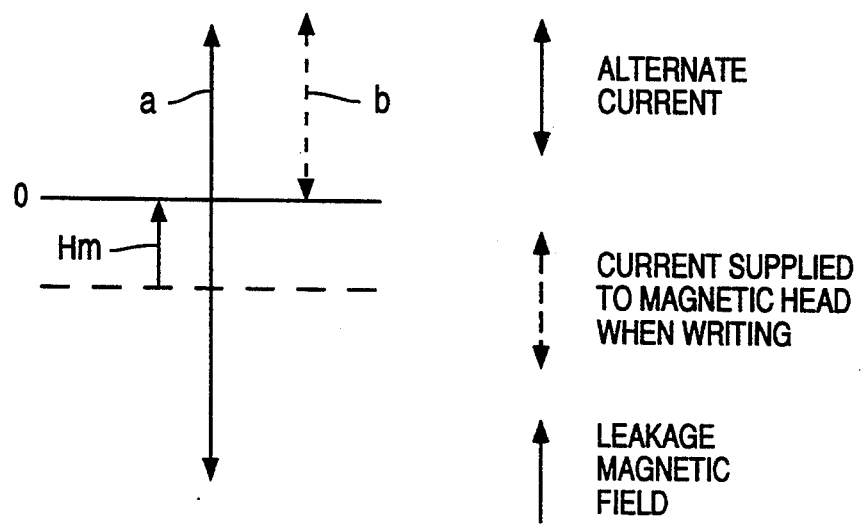
Figure 5C:
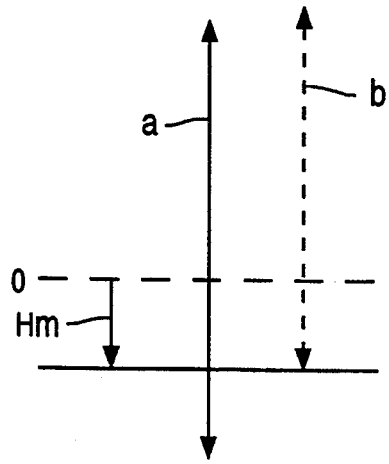

In an ideal case, no leakage magnetic field is formed as shown in FIG. 5 (A). In FIG. 5 (A), the solid line arrow a indicates the alternate current supplied to the magnetic head 3, and the broken line arrow b the magnitude of the current for recording information (which is proportional to the strength of the magnetic field generated by the coil of the head 3). When the strength of the leakage magnetic field at the information recording medium of the disk 4 is $H_m$ (indicated by the thick arrow), and the direction of the leakage magnetic field coincides with the writing direction of inverting the magnetization for recording information (the direction for inverting the magnetization of the medium from the initial state; in this example, the plus direction), the amplitude of the plus side of the alternate current is decreased by the amount corresponding to the strength $H_m$ as shown in FIG. 5(B) (i.e., the alternate current is offset from that of FIG. 5(A)), so that the magnetic field of the same strength as that in the case of FIG. 5(A) is applied to the medium. When the direction of the leakage magnetic field is opposite to the writing direction (i.e., the direction of the leakage magnetic field corresponds to the minus direction), the amplitude of the plus side of the alternate current is increased by the amount corresponding to the strength $H_m$ as shown in FIG. 5(C), so that the magnetic field of the same strength as that in the case of FIG. 5 (A) is applied to the medium.

For example, when the amplitudes in the plus and minus sides of the alternate current were set to be 0.3 A and 0.7 A in the case of FIG. 5(B), the C/N ratio was decreased by 4 dB from those obtained under the same conditions described above. In contrast, when the offset value was increased so that the amplitudes in the plus and minus sides of the alternate current became 0.25 A and 0.75 A, the obtained C/N ratio was substantially the same as those which are shown as the maximum in FIG. 4.

As apparent from above, the influence of the leakage magnetic field can be eliminated by providing an offset to the alternate current supplied to the magnetic head 3, the direction of which is selected so as to cancel the leakage magnetic field. Therefore, even if the magnetic head 3 produces a weak magnetic field to be applied to the medium, information can be recorded on the medium, resulting in that the number of turns of the coil in the magnetic head 3 can be reduced so as to reduce the inductance of the coil.

The manner of embodying the invention is not limited to the above, and the value of the offset may be suitably selected depending upon conditions such as the kind of the medium of the disk 4.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In an external magnetic field device for a magnetooptical information recording and reproducing apparatus in which an external magnetic field is applied to a magnetooptical information recording medium thereby performing a direct overwrite of information when said field is modulated by recording information by supplying to a magnetic field generating means an alternate current according to said recording information, an improvement being that said device comprises an offset means for producing an offset in said alternate current having one of either a level having a polarity or a different level having an opposite polarity, said offset being so produced that said alternate current supplied to said magnetic field generating means is decreased when said supplying according to recording information is such that a direction of magnetization of said information recording medium be aligned with an initial direction of magnetization of said recording medium.

2. A device according to claim 1 wherein said magnetic field generating means is a magnetic coil of a magnetic head.

3. A device according to claim 1 wherein the ratio of said alternate current level having said polarity to the other said alternate current level having a polarity opposite to said polarity is 7:3.

4. A device according to claim 1, wherein the amount of said offset is regulated so that a leakage magnetic field, which is caused by another magnetic field generating means in said apparatus and applied to said information recording medium, is cancelled.

5. A device according to claim 4 wherein the first magnetic field generating means is a magnetic coil of a magnetic head.

6. A device according to claim 4 wherein said other magnetic field generating means is an actuator for focusing a laser beam onto said information recording medium.

7. A device according to claim 4 wherein said other magnetic field generating means is an actuator for tracking a laser beam on said information recording medium.

8. In an external magnetic field device for a magnetooptical information recording and reproducing apparatus according to claim 1, wherein said offset is so produced that said external magnetic field is large in a reverse direction to the initial magnetization of said information recording medium and is small in the same direction as the initial magnetization of said information recording medium.

* * * * *

UNITED STATES PATENT AND TRADEMARK OFFICE
CERTIFICATE OF CORRECTION

PATENT NO. : 5,343,448

DATED : August 30, 1994

INVENTOR(S) : Tomoyuki Miyake, et al

Page 1 of 2

It is certified that error appears in the above-indentified patent and that said Letters Patent is hereby corrected as shown below:

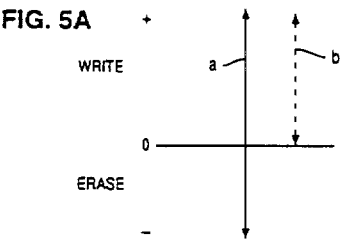

FIG. 5A should read

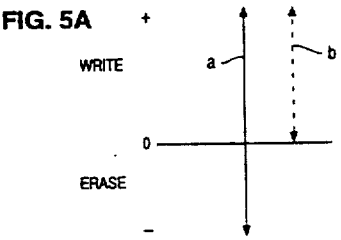

FIG. 5A

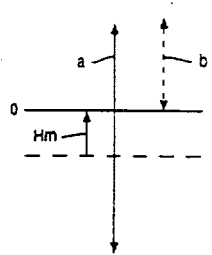

FIG. 5B should read

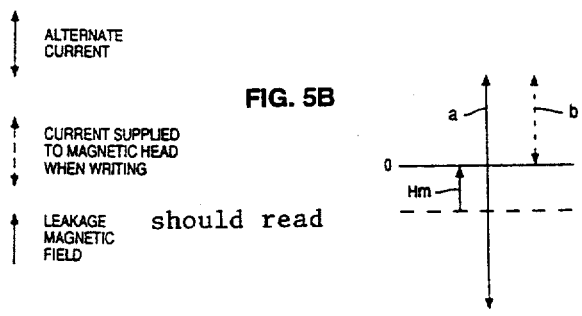

FIG. 5B

UNITED STATES PATENT AND TRADEMARK OFFICE
CERTIFICATE OF CORRECTION

PATENT NO. : 5,343,448
DATED : August 30, 1994
INVENTOR(S) : Tomoyuki Miyake, et al It is certified that error appears in the above-indentified patent and that said Letters Patent is hereby corrected as shown below:

FIG. 5C 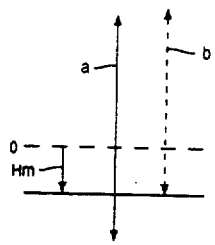    should read    FIG. 5C 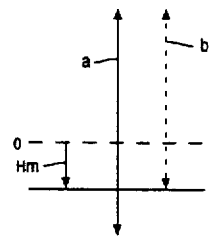

Signed and Sealed this

Sixth Day of December, 1994

Attest:

*Bruce Lehman*

BRUCE LEHMAN

*Attesting Officer*     Commissioner of Patents and Trademarks